United States Patent [19]

Fujimaki et al.

[11] Patent Number: 4,866,131
[45] Date of Patent: Sep. 12, 1989

[54] RUBBER COMPOSITION FOR HIGH-PERFORMANCE TIRE TREAD

[75] Inventors: Tatsuo Fujimaki; Noboru Oshima, both of Tokyo, Japan

[73] Assignees: Bridgestone Corporation; Japan Synthetic Rubber Co., Ltd., both of Tokyo, Japan

[21] Appl. No.: 93,156

[22] Filed: Sep. 2, 1987

Related U.S. Application Data

[63] Continuation of Ser. No. 828,357, Feb. 11, 1986, abandoned.

[30] Foreign Application Priority Data

Mar. 5, 1985 [JP] Japan .................. 60-41789

[51] Int. Cl.$^4$ .................. C08L 53/02; C08L 55/02
[52] U.S. Cl. .................. 525/96; 525/95; 525/237; 525/241; 525/314
[58] Field of Search .................. 525/95, 236, 314, 96, 525/237, 241

[56] References Cited

U.S. PATENT DOCUMENTS

| | | | |
|---|---|---|---|
| 4,367,325 | 1/1983 | Takeuchi et al. | 526/340 |
| 4,387,756 | 6/1983 | Ogawa et al. | 526/340 |
| 4,433,094 | 2/1984 | Ogawa et al. | 524/496 |
| 4,485,205 | 11/1984 | Fujimaki et al. | 525/237 |
| 4,515,922 | 5/1985 | Sakakibara et al. | 525/95 |

FOREIGN PATENT DOCUMENTS

| | | |
|---|---|---|
| 0074233 | 3/1983 | European Pat. Off. . |
| 0087736 | 9/1983 | European Pat. Off. . |
| 073991 | 1/1978 | Japan .................. 525/95 |
| 964185 | 7/1964 | United Kingdom . |
| 1501378 | 2/1978 | United Kingdom . |

*Primary Examiner*—Jacob Ziegler
*Attorney, Agent, or Firm*—Foley & Lardner, Schwartz, Jeffery, Schwaab, Mack, Blumenthal & Evans

[57] ABSTRACT

Disclosed is a novel rubber composition for the treads of high-performance tires including racing tires. The elastomer component of the rubber composition consists essentially of 10–60 wt % of a low molecular weight copolymer of an aliphatic diene, e.g. butadiene, and an aromatic vinyl compound, e.g. styrene, and the balance of a conventional diene rubber such as a high styrene styrene-butadiene rubber. The copolymer is the product of solution copolymerization reaction of the aliphatic and aromatic monomers in a hydrocarbon solvent using an organic lithium compound as the initiator, and the molecular weight of the copolymer is from about 2000 to about 50000. The rubber composition provides very high road gripping ability and is sufficiently high also in rupture strength, heat resistance and wear resistance.

7 Claims, No Drawings

RUBBER COMPOSITION FOR HIGH-PERFORMANCE TIRE TREAD

This application is a continuation, of application Ser. No. 828,357, filed Feb. 11, 1986, now abandoned.

BACKGROUND OF THE INVENTION

This invention relates to a rubber composition for the treads of high-performance tires including racing tires. In the rubber composition the essential elastomer component is a blend of a conventional diene rubber such as styrene-butadiene rubber and a low molecular weight copolymer of an aliphatic diene and an aromatic vinyl compound.

For the treads of racing tires, it is known to use a rubber composition containing a large amount of a softening agent represented by aromatic oil with a view to enhancing the road gripping ability. Certainly, the inclusion of a large amount of aromatic oil or an equivalent is effective in increasing the hysteresis loss value (tan δ). However, from broad considerations this measure has proved to be unfavorable because some important characteristics of tire treads such as rupture strength, wear resistance and blowout resistance are significantly marred by the increased softening agent.

An example of conventional rubbers used in the treads of racing tires in view of high hysteresis loss values is high-styrene styrene-butadiene copolymer rubber prepared by emulsion polymerization. However, this rubber is rather inferior in vulcanizability together with anotier diene rubber and is not sufficiently high in rupture strength. U.S. patent application Ser. No. 755,997 filed July 17, 1985, now abandoned, in which the joint inventors include the both inventors of the present application, discloses a tire tread rubber composition comprising a copolymer of an aliphatic diene and an aromatic vinyl compound prepared by solution polymerization.

SUMMARY OF THE INVENTION

It is an object of the present invention to provide a novel rubber composition for the treads of high-performance tires including racing tires, which is large in the hysteresis loss value and excellent in heat resistance and is also sufficiently high in rupture strength and wear resistance.

The present invention provides a high-performance tire tread rubber composition to accomplish the above object, and the primary feature of the invention resides in that the elastomer component of the rubber composition consists essentially of 10 to 60% by weight of a low molecular weight copolymer of an aliphatic diene and an aromatic vinyl compound and the balance of a diene rubber, and that the mentioned copolymer is the product of a solution copolymerization reaction of the aliphatic and aromatic monomers in a hydrocarbon solvent in the presence of an organic lithium compound as an initiator and has a molecular weight in the range from about 2000 to about 50000.

For example, the low molecular weight copolymer is a copolymer of a butadiene with styrene, and the diene rubber is a high styrene styrene-butadiene rubber.

A tire tread rubber composition according to the invention provides very high performance particularly in respect of the road gripping ability and, furthermore, posesses very good balance between the hysteresis loss value as an indication of the road gripping ability and other imporant characteristics such as rupture strength, heat resistance and wear resistance which are required for racing tires to be used under very severe conditions.

As a tire tread material, a rubber composition of the invention is useful in high-performance tires for general purposes and also in high-performance racing tires, and the invention is applicable to both automobiles and motorcycles.

DESCRIPTION OF THE PREFERRED EMBODIMENTS

In preparing a low molecular weight copolymer of an aliphatic diene and an aromatic vinyl compound for use in the present invention, the aliphatic diene is usually selected from butadiene, isoprene, penadiene and 2,3-dimethylbutadiene. Butadiene is preferred to other dienes. As to the aromatic vinyl compound, it is preferable to make a selection among styrene, p-methylstyrene and a-methylstyrene though it is also possible to use m-methylstyrene, p-tert-butylstyrene, chloromethylstyrene or vinyltoluene.

To obtain a rubber composition which provides high road gripping ability and is also sufficiently high in rupture strength and wear resistance, the molecular weight of the aforementioned copolymer must be within the range from about 2000 to about 50000. If the molecular weight is below about 2000 the copolymer is not sufficiently effective in improving the war resistance and road gripping ability of the rubber composition. If the molecular weight of the copolymer is above about 50000, the resultant rubber composition does not sufficiently augment in the hysteresis loss value and, hence, in the road gripping ability though it exhibits excellent wear resistance.

In the elastomer component of a rubber composition according to the invention the amount of the low molecular weight copolymer is limited within the range from 10 to 60 wt%. If the amount of the copolymer in the elastomer component is less than 10 wt% the favorable effects of the copolymer on the wear resistance, heat resistance and road gripping ability remain insufficient. If the copolymer amounts to more than 60 wt% of the elastomer component the rubber composition becomes rather inferior in wear resistance and heat resistance though the hysteresis loss value becomes larger.

A low molecular weight copolymer of an aliphatic diene and an aromatic vinyl compound suitable for use in this invention is prepared by a solution polymerization reaction which can be carried out in various manners. For example, copolymerization of butadiene and a selected aromatic vinyl compound dissolved in a hydrocarbon solvent can be accomplished on an industrial scale in a vessel type or tower type reactor by using an organic lithium compound represented by n-butyllithium as a polymerization initiator in the presence of either an ether or a tertiary amine.

When butadiene is employed as the aliphatic diene to be copolymerized with an aromatic vinyl compound, it is preferred to control the amount X (in weight percentages) of the aromatic vinyl compound bound in the copolymer and the amount Y (in weight percentages) of butadiene units having vinyl group (hereinafter will be referred to as "vinylic butadiene units") in the total butadiene units in the obtained copolymer such that $X + Y/2$ takes a value not smaller than 25 and not larger than 70. When the value of $X + Y/2$ falls within such a range it is possible to obtain a rubber composition which is very large in the hysteresis loss value and, hence, is greatly improved in the road gripping ability and is very high also in rupture strength, wear resistance and heat resistance. When the value of $X + Y/2$ is smaller than 25 it is difficult to greatly increase the hysteresis loss value. When the value of $X + Y/2$ is larger han 70 it is difficult to produce a marked improvement in the road gripping ability, and the dependence of the elastic modulus of the rubber composition on temperature becomes very significant. As the butadiene monomer, it is suitable to use 1,3-butadiene containing a small amount of 1,2-butadiene.

A conventional diene rubber is used for blending with the above described low molecular weight copolymer. It is suitable to use a high styrene styrene-butadiene copolymer rubber (SBR) prepared by either a solution polymerization method or an emulsion polymerization method, an acrylonitrilebutadiene copolymer rubber (NBR) or a chloroprene rubber. Particularly the use of a high styrene SBR prepared by either solution polymerization or emulsion polymerization is preferred. In any case it is desirable that the glass transition temperature $T_g$ of the diene rubber is not lower than $-60°$ C. with consideration of the wear resistance, heat resistance and road gripping ability of the rubber composition. Herein, the glass transition temperature $T_g$ is defined to be a temperature at which a curve given by plotting heat capacity of the rubber against temperature with a differential scanning calorimeter (DSC) exhibits an inflection.

An extender oil may be incorporated into a rubber composition according to the invention in order to further increase the hysteresis loss value. For this purpose it is suitable to use an aromatic oil of which the viscosity gravity constant according to ASTM 02501 is in the range from 0.900 to 1.100, and preferably in the range from 0.920 to 0.990.

A rubber composition according to the invention may optionally contain commonly used compounding agents such as, for example, carbon black, other kinds of fillers, vulcanizing agent and vulcanization accelerators.

The invention will further be illustrated by the following nonlimitative examples.

EXAMPLES 1–8

(1) Preparation of Low Molecular Weight Copolymers

According to the Formulations A to H shown in Table 1, eight kinds of low molecular weight copolymers of butadiene and styrene were prepared each by the following process.

Together with 2000 g of cyclohexane the quantities of butadiene and styrene monomers and tetrahydrofuran shown in Table 1 were charged into a 5-liter reactor in which the gas atmosphere was replaced by nitrogen, and then n-butyllithium was added to initiate copolymerization reaction in the manner of solution polymerization. The copolymerization reaction was carried out under an adiabatic condition while maintaining the reaction temperature within the range of 30°–80° C. After 100% conversion of the monomers into a copolymer, di-tert-butyl-p-cresol employed as an age resistor was added in a proportion of 0.7 g to 100 g of the copolymer. After that the solvent was removed from the copolymer by a usual drying procedure.

For comparison, two kinds of butadiene-styrene copolymers not in accordance with the present invention, viz. P and Q in Table 1, were prepared by the same process.

The structural characteristics of the obtained copolymers A-H, P and Q were as shown in Table 1. The molecular weights were measured with a Type 200 GPC (gas permeation chromatography) instrument of WATERS Co. using polystyrene as a standard sample.

TABLE 1

| Name of Copolymer | Monomers butadiene (g) | Monomers styrene (g) | Tetra-hydro-furan (g) | n-Butyl-lithium (g) | Butadiene-Styrene Copolymer bound styrene X (%) | vinylic butadiene units in total butadiene units Y (%) | X + Y/2 | molecular weight |
|---|---|---|---|---|---|---|---|---|
| A | 400 | 100 | 25 | 30 | 20 | 69 | 54.4 | 3100 |
| B | 400 | 100 | 25 | 3.2 | 20 | 71 | 55.5 | 15000 |
| C | 400 | 100 | 0.7 | 3.2 | 20 | 20 | 30 | 14000 |
| D | 400 | 100 | 10 | 3.2 | 20 | 40 | 40 | 14000 |
| E | 435 | 65 | 25 | 3.2 | 13 | 70 | 48 | 14000 |
| F | 250 | 250 | 22 | 3.2 | 50 | 39 | 69.5 | 14000 |
| G | 150 | 350 | 0.1 | 3.2 | 70 | 18 | 79 | 14000 |
| H | 450 | 50 | 0.7 | 3.2 | 10 | 20 | 20 | 14000 |
| P | 400 | 100 | 25 | 60 | 20 | 70 | 55 | 1200 |
| Q | 400 | 100 | 25 | 0.58 | 20 | 70 | 55 | 62000 |

(2) Preparation of Rubber Composition

As Examples 1–8, eight kinds of rubber compositions were prepared according to the formulation shown in Table 2 by selectively using the low molecular weight butadiene-styrene copolymers A–H. In every case the diene rubber was an oil extended high-styrene SBR, T 0120 supplied from Japan Synthetic Rubber Co., containing 37.5 parts by weight of aromatic oil per 100 parts by weight of styrenebutadiene copolymer. In each example a blend of the ingredients was kneaded by a usual method, and the obtained rubber composition was vulcanized at 145° C. for 40 min.

COMPARATIVE EXAMPLES 1–4

As Comparative Examples 1 and 2, two kinds of rubber compositions were prepared in the same manner as in the above Examples except that the butadienestyrene copolymers P and Q were used, respectively, in place of the copolymers A–H in Examples. As Comparative Examples 3 and 4, the proportion of the butadiene-styrene copolymer B to the SBR (T 0120) was greatly decreased and increased, respectively, and the amount of the aromatic oil was varied as shown in Table 3.

TABLE 2

Compounding Formulation

| Ingredients | Amounts (parts by weight) |
| --- | --- |
| diene rubber (SBR T 0120) | 80* |
| low MW butadiene-styrene copolymer | 20 |
| aromatic oil | 70 |
| HAF carbon black | 100 |
| stearic acid | 2 |
| zinc oxide | 3 |
| age resister (N—phenyl-N'—isopropyl-p-phenylenediamine) | 1 |
| accelerator (2,2'-dithio-bis-benzothiazole) | 0.6 |
| accelerator (1,3-diphenyl guanidine) | 1.2 |
| sulfur | 1.5 |

*The extender oil was left out of account.

On the vulcanized rubber compositions of Examples 1-8 and Comparative Examples 1-4, measuremnet of the tensile strength, blowout temperature and hysteresis loss (tan δ) gave the results as shown in Table 3. The measurement of tensile strength was in accordance with JIS K 6301. The blowout temperature was measured with a Goodrich flexometer. The hysteresis loss was measured with a mechanical spectrometer produced by Rheometric Co. As to the testing conditions: strain shear was 1%, temperatre was 60° C., and frequency was 15 HZ. Furthermore, a cart test was made on each rubber composition as a tire tread material. The cart test course was 720 m round. After 10 rounds of running the wear resistance of each sample tread material was evaluated by visual observation of the amount of wear. For each sample, Table 3 shows the evaluation of wear resistance and the best lap time in the 10 rounds of running. It is reasonable to conclude that the lap time becomes shorter as the road gripping ability of the tested tires augments.

As can be seen in Table 3, the rubber compositions of Examples 1-8 exhibited very well balanced rupture strength, blowout temperature, heat resitance, wear resistance and road gripping ability, and particularly the rubber compositions of Examples 1-5 and 7 using the low molecular weight butadiene-styrene copolymers adequate in the value of X +Y/2 wre excellent in every item. Accordingly, these rubber compositions are suitable as the tread material for high-performance tires and particularly for high-performance racing tires to be used under very severe conditions. In contrast, the rubber compositions of Comparative Examples 1-4 do not possess good balance between the above named items and, therefore, are not suitable for use in high-performance tires as the tread material.

TABLE 3

| | Fundamental Materials | | | Physical Properties and Performance | | | | |
| --- | --- | --- | --- | --- | --- | --- | --- | --- |
| | butadiene-styrene copolymer (parts by weight) | SBR (parts by weight)* | aromatic oil (parts by weight) | tensile strength (kgf/cm²) | blowout temperature (°C.) | tan δ | wear resistance | best lap time (sec) |
| Ex. 1 | A: 20 | 80 (110) | 70 | 161 | 214 | 0.27 | excellent | 35.82 |
| Ex. 2 | B: 20 | 80 (110) | 70 | 174 | 218 | 0.28 | excellent | 35.60 |
| Ex. 3 | D: 20 | 80 (110) | 70 | 165 | 210 | 0.26 | excellent | 35.91 |
| Ex. 4 | E: 20 | 80 (110) | 70 | 158 | 212 | 0.26 | excellent | 35.88 |
| Ex. 5 | F: 20 | 80 (110) | 70 | 171 | 210 | 0.28 | excellent | 35.55 |
| Ex. 6 | G: 20 | 80 (110) | 70 | 158 | 200 | 0.29 | good | 35.99 |
| Ex. 7 | C: 20 | 80 (110) | 70 | 156 | 205 | 0.26 | excellent | 35.82 |
| Ex. 8 | H: 20 | 80 (110) | 70 | 154 | 204 | 0.25 | good | 35.96 |
| Comp. Ex. 1 | P: 20 | 80 (110) | 70 | 138 | 204 | 0.23 | insufficient | 36.22 |
| Comp. Ex. 2 | Q: 20 | 80 (110) | 70 | 168 | 213 | 0.22 | excellent | 36.31 |
| Comp. Ex. 3 | B: 5 | 95 (130.6) | 64.4 | 170 | 210 | 0.22 | excellent | 36.11 |
| Comp. Ex. 4 | B: 70 | 30 (41.3) | 88.8 | 65 | 190 | 0.35 | insufficient | 36.42 |

*The parenthesized quantity includes the extender oil.

What is claimed is:

1. A rubber composition for the tread of a high-performance tire, consisting essentially of:
   a first diene component comprising from 10 to 60% by weight of a low molecular weight copolymer of butadiene and an aromatic vinyl compound, said copolymer being the product of a solution copolymerization reaction of the butadiene and aromatic monomers in a hydrocarbon solvent in the presence of an organic lithium compound as an initiator and having a molecular weight in the range from about 2000 to about 50000, wherein the weight percentage (X) of said aromatic vinyl compound in said copolymer and the weight percentage (Y) of butadiene units having vinyl group to the total butadiene units in said copolymer is such that X +Y/2 takes a value not smaller than 25 and not larger than 70; and
   a second diene component different from said first diene component, said second diene component being a high-styrene styrene-butadiene rubber prepared by solution polymerization or emulsion polymerization.

2. A rubber composition according to claim 1, wherein said aromatic vinyl compound is selected from the group consisting of styrene, p-methylstyrene, m-methylstyrene, α-methylstyrene, chloromethylstyrene and vinyltoluene.

3. A rubber composition according to claim 2, wherein said aromatic vinyl compound is selected from the group consisting of styrene, p-methylstyrene and α-methylstyrene.

4. A rubber composition according to claim 1, wherein said diene rubber has a glass transition temperature not lower than −60° C.

5. A rubber composition according to claim 1, wherein said copolymer is the product of a solution copolymerization reaction comprising about 400 grams of butadiene monomer, about 100 grams of styrene monomer, about 2000 grams of cyclohexane and about 30 grams of n-butyllithium.

6. A rubber composition according to claim 1, wherein said copolymer is the product of a solution copolymerization reaction comprising about 450 grams of butadiene monomer, 50 grams of styrene monomer, about 2000 grams of cyclohexane and about 3.2 grams of n-butyllithium.

7. A rubber composition according to claim 1, wherein said copolymer is the product of a solution copolymerization reaction comprising about 150 grams of butadiene monomer, 350 grams of styrene monomer, about 2000 grams of cyclohexane and about 3.2 grams of n-butyllithium.

* * * * *